US012334862B2

(12) United States Patent
Quan et al.

(10) Patent No.: US 12,334,862 B2
(45) Date of Patent: Jun. 17, 2025

(54) DAMPING SYSTEM OF A SOLAR TRACKER

(71) Applicant: TRINA SOLAR, S.L.U., Madrid (ES)

(72) Inventors: Peng Quan, Madrid (ES); Juan Manuel Gómez Garcia, Madrid (ES); Abraham Ruiz Molinero, Madrid (ES)

(73) Assignee: TRINA SOLAR SPAIN, S.L.U., Madrid (ES)

( * ) Notice: Subject to any disclaimer, the term of this patent is extended or adjusted under 35 U.S.C. 154(b) by 98 days.

(21) Appl. No.: 18/320,670

(22) Filed: May 19, 2023

(65) Prior Publication Data
US 2023/0396211 A1 Dec. 7, 2023

(30) Foreign Application Priority Data

Jun. 3, 2022 (ES) .............................. U 202230932

(51) Int. Cl.
H02S 20/32 (2014.01)
F16F 15/16 (2006.01)

(52) U.S. Cl.
CPC ............ H02S 20/32 (2014.12); F16F 15/161 (2013.01)

(58) Field of Classification Search
CPC ................................. H02S 20/32; Y02E 10/47
See application file for complete search history.

(56) References Cited

U.S. PATENT DOCUMENTS

| | | | |
|---|---|---|---|
| 6,237,888 B1 * | 5/2001 | Coll ..................... | H01Q 1/1207 248/539 |
| 2010/0089389 A1 * | 4/2010 | Seery .................... | H01L 31/042 126/608 |
| 2018/0245356 A1 * | 8/2018 | Muth ....................... | E04G 3/20 |
| 2022/0182008 A1 * | 6/2022 | Worden ................. | H02S 20/32 |
| 2023/0030803 A1 * | 2/2023 | LoBue .................... | H02S 20/32 |

* cited by examiner

Primary Examiner — Thanh Luu
(74) Attorney, Agent, or Firm — LUCAS & MERCANTI, LLP

(57) ABSTRACT

A damping system of a solar tracker is provided, having at least one damper has a rod, an upper tie and a lower tie located at the end of the damper opposite the upper tie; where the upper tie is fixed by an upper support to a rotation shaft of the solar tracker, and where the lower tie is fixed by a lower support to a column of the solar tracker, so that with the rotation of the rotation shaft, the rod of the damper is caused to retract or extend, characterized in that the upper support has a lever comprising at least one end protruding from the rotation shaft with at least two securing points at which the upper tie of the damper is fixed by an upper shaft of the upper tie which is fixed at the at least two securing points of the lever.

14 Claims, 16 Drawing Sheets

DAMPING SYSTEM OF A SOLAR TRACKER

CROSS-REFERENCE TO RELATED APPLICATION

This application claims priority of Spanish Patent Application No. U202230932, filed Jun. 3, 2022, the contents of which are incorporated herein by reference.

TECHNICAL FIELD

The present invention relates to a solar tracker component, more specifically a damping system installed in a solar tracker.

STATE OF THE ART

Over time, the use of photovoltaic solar panels made up of numerous cells responsible for converting sunlight into useful electricity in a renewable and environmentally friendly manner has become popular.

To maximize the production of electricity, it is common to install said solar panels in solar trackers, optimizing the angle with which the solar panels receive solar radiation.

Solar trackers are mobile structures which fix the solar panel to the ground, commonly comprising columns separating the solar panel from the ground, which are connected to a rotation shaft, which is configured to rotate about its axis by the action of an actuator (for example, a motor), and in which the solar panels are fixed.

One of the drawbacks that can arise in solar trackers is the sudden rotation of the rotation shaft due to external forces, for example due to strong winds, which causes misalignment of the solar tracker, which in turn causes the drawback of reducing the production of electricity, as the solar panels are not perpendicular to the solar radiation.

Another drawback is that the sudden rotation of the solar tracker causes the occurrence of different efforts which reduce the service life of the different components of the solar tracker.

Likewise, in the worst case scenario, major accidents or mechanical damage to the solar trackers can be caused.

In order to prevent the sudden rotation of the rotation shaft, the use of different blocking systems is known. An example of these blocking systems is that the actuator itself of the solar tracker prevents the unwanted rotation of the rotation shaft.

This causes the drawback of reducing the service life of the actuator, not only due to the continuous effort required to block the solar tracker, but also due to the added effort that the actuator must make to avoid sudden rotation while actual rotation of the tracker occurs.

For this reason, the use of damping systems is known to prevent sudden rotation of the solar tracker. These systems usually comprise at least one damper (for example, a hydraulic cylinder), which in turn comprises an upper tie and a lower tie.

Said upper tie is fixed by means of an upper support to the rotation shaft, said upper support comprising a sheet and a lever which are fixed together by clamping the rotation shaft by means of bolts.

In said damping system, the profile of said lever has a flat profile, at the end of which furthest away from the rotation shaft there protrudes an upper horizontal shaft through which the upper tie of the damper is fixed.

Since this upper shaft is only attached to the lever at one of its ends, this upper shaft experiences greater wear due to the concentration of efforts at said end, decreasing the service life of the damping system.

Likewise, the lower tie of the damper is fixed by means of a lower support to a column of the solar tracker, the lower support comprising two plates which are fixed together by clamping the column by means of bolts.

The lower support comprises a horizontal lower shaft, through which the lower tie of the damper is fixed so that it has the ability to rotate with respect to the column.

As in the case of the upper shaft, this lower shaft is attached at only one end to the rest of the lower support, so the lower shaft experiences greater wear due to the concentration of efforts at said end, decreasing the service life of the damping system.

Therefore, there is a need for a damping system of a solar tracker which distributes the efforts, increasing the service life of the damping system.

OBJECT OF THE INVENTION

In order to meet this objective and solve the technical problems discussed so far, in addition to providing additional advantages that can be derived later, the present invention provides a damping system of a solar tracker comprising at least one damper comprising a rod, an upper tie and a lower tie located at the end of the damper opposite the upper tie; where the upper tie is fixed by means of an upper support to a rotation shaft of the solar tracker, and where the lower tie is fixed by means of a lower support to a column of the solar tracker, so that with the rotation of the rotation shaft, the rod of the damper is caused to retract or extend, characterized in that the upper support comprises a lever comprising at least one end protruding from the rotation shaft with at least two securing points at which the upper tie of the damper is fixed by means of an upper shaft which is fixed at the at least two securing points of the lever.

It should be noted that the end of the lever protruding from the rotation shaft is understood as the part of the lever protruding from the rotation shaft in plan view, the dimension of the lever being greater than the section of the rotation shaft.

Limiting the maximum rotation speed of the solar tracker is thereby achieved, damping the solar tracker in the event of a sudden rotation, for example due to strong winds, which in turn prevents the occurrence of misalignments in the solar tracker and allows the upper shaft to be supported at both ends, instead of just one, which could cause undesired bending of the fixing of the shaft which affects the damper; therefore, with this configuration a better distribution of efforts is obtained, thereby increasing the service life of the damping system.

Preferably, the lever has an inverted U-shaped profile comprising at least one securing point on each wing of the lever, thereby achieving the upper shaft being located in a transverse direction with respect to the column of the solar tracker, thus achieving an optimal configuration.

Preferably, the upper support comprises an upper clamp surrounding the rotation shaft and the lever is fixed to the upper clamp, thereby providing greater stability to the fixing between the upper support and the rotation shaft.

Preferably, the upper clamp has an omega-shaped profile on the wings of which the lever is fixed, such that the omega-shaped profile of the upper clamp allows the upper clamp to easily clamp the rotation shaft, which facilitates the installation of the damping system, reducing the time and, therefore, the installation costs of the damping system.

Preferably, the present damping system comprises two dampers and the lever comprises two ends protruding from the rotation shaft in which the upper tie of the respective damper is fixed at each end, thus the damping efforts are shared between both dampers, reducing the individual wear of each damper and thereby increasing the service life of the damping system.

In an exemplary embodiment, the lower support comprises a lower clamp with an omega-shaped profile surrounding the column, on the wings of which there is fixed a plate to which the lower damper fastening is fixed, thus facilitating the installation of the damping system, reducing the time and, therefore, the installation costs.

In another exemplary embodiment, the lower support comprises a lower clamp comprising two sub-clamps with an L-shaped profile superimposed on one another, being fixed to the column and clamping same by means of bolts, thereby achieving the lower clamp being able to clamp columns of different sizes and profiles as each L-shaped sub-clamp has slot-shaped holes that allow the lower clamp to be adjusted on the column by means of bolts.

Preferably, a plate is fixed on the superimposed wings of the sub-clamps in which the lower tie of the damper is fixed, thereby providing greater stability to the fixing between the lower support and the lower tie.

Preferably, the plate comprises two fins projecting outwards, between which there is arranged a sheet to which at least one end of a lower shaft is fixed, the other end of the lower shaft being fixed to the plate or to the sheet and where the lower tie is fixed to the lower shaft, which allows the lower shaft to be supported at both ends, obtaining a better distribution of loads on the lower shaft, thereby increasing its resistance to efforts and the service life of the damping system.

DETAILED DESCRIPTION OF THE INVENTION

Figure 1:
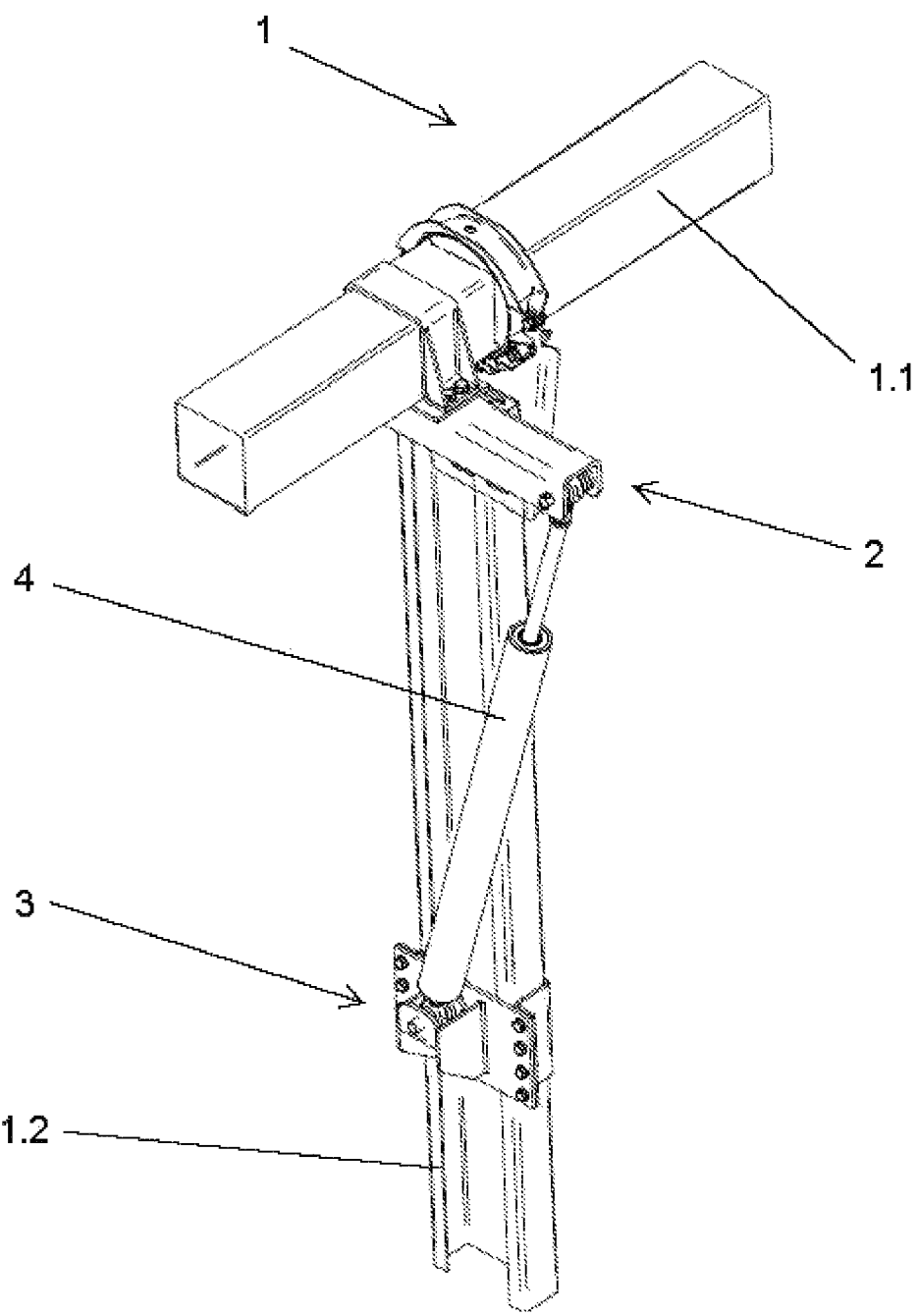
FIG. 1 shows a perspective image of a preferred exemplary embodiment of the damping system of a solar tracker of the present invention.
Figure 2:
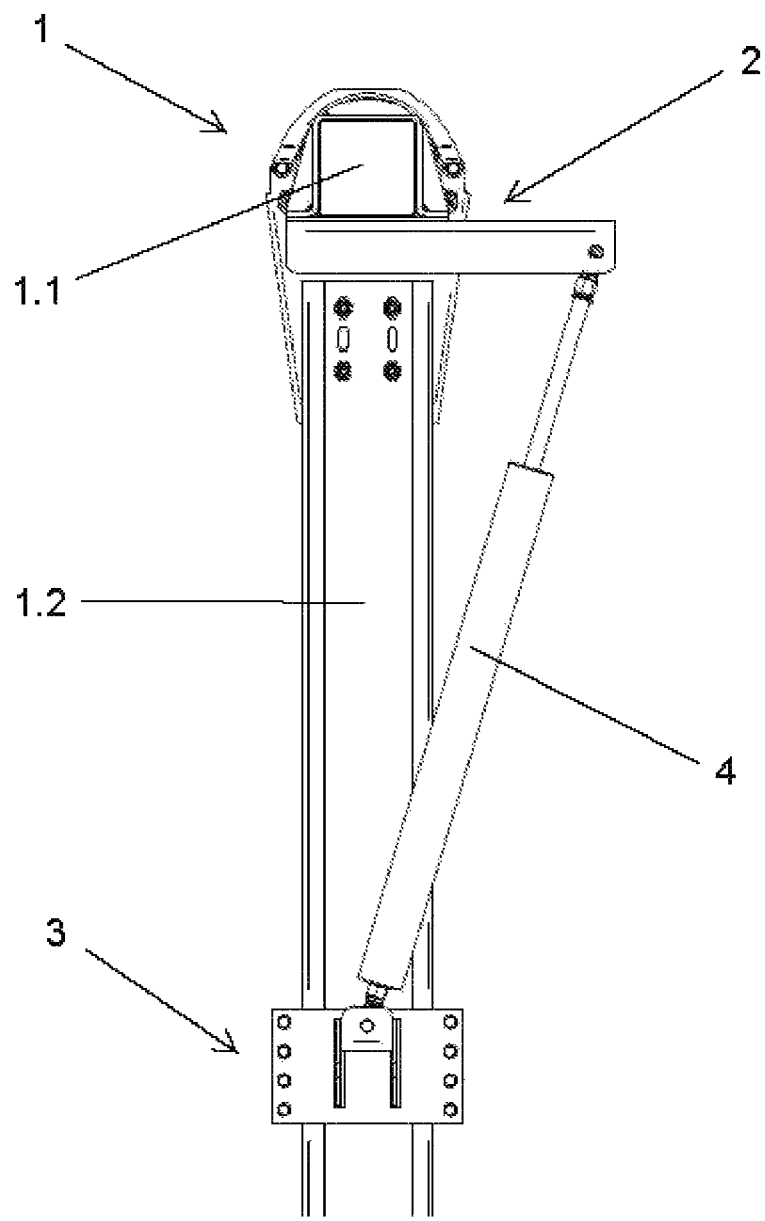
FIG. 2 shows a profile image of the damping system shown in FIG. 1.

The present invention relates to a damping system of a solar tracker (1), as can be seen in the preferred exemplary embodiment of FIGS. 1 and 2, the present damping system comprises at least one upper support (2) fixed to a rotation shaft (1.1) of the solar tracker (1), a lower support (3) fixed to a column (1.2) of the solar tracker (1) and a damper (4) attached at its ends to the upper support (2) and to the lower support (3).

Normally, the solar tracker (1) comprises an actuator to cause the rotation of the solar tracker (1), preferably located substantially in the middle of the rotation shaft (1.1), for a better distribution of the forces along the rotation shaft (1.1).

In a non-limiting manner, the present damping system would be installed at least at one end of the rotation shaft (1.1), even more preferably the damping system would be installed at both ends of the rotation shaft (1.1).

A better distribution of the forces exerted on the rotation shaft (1.1) by the actuator and the damping system is thereby achieved, improving the service life of the rotation shaft (1.1).

Figure 3:
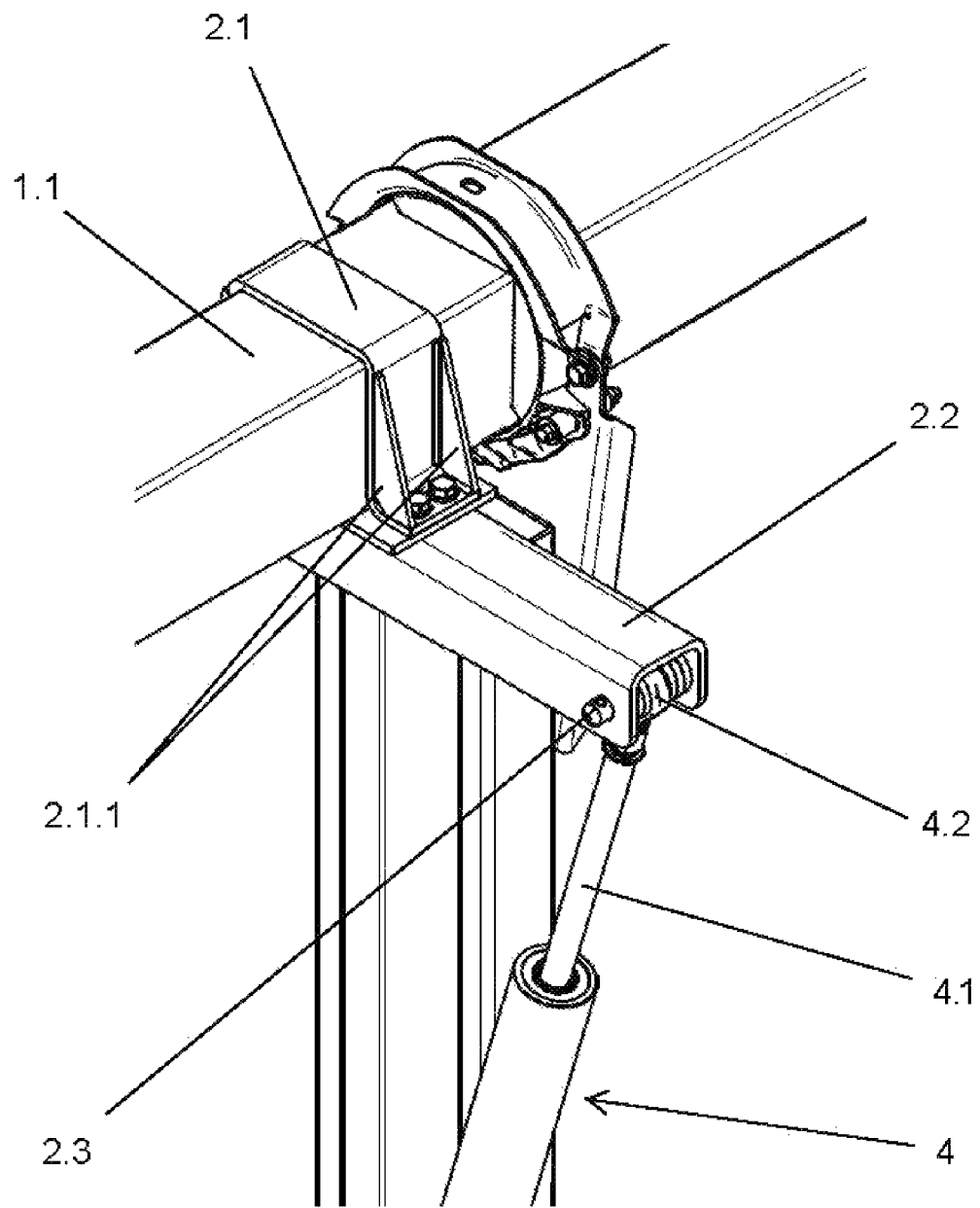
FIG. 3 shows a perspective image of the upper support shown in FIG. 1.
Figure 4:
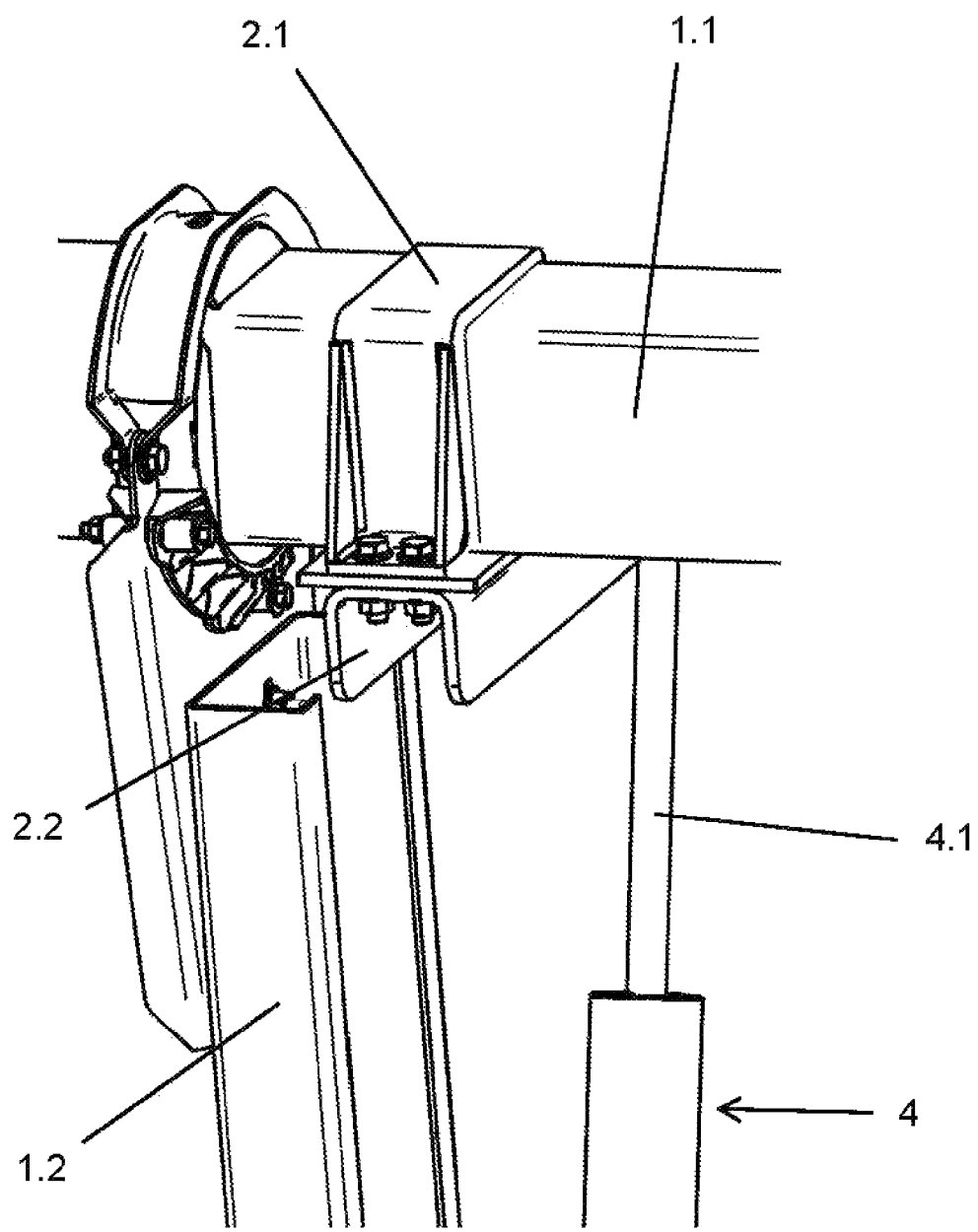
FIG. 4 shows a perspective image of the upper support from a different view than FIG. 3.

As can be seen in FIGS. 3 and 4, the upper support (2) comprises an omega-shaped upper clamp (2.1) configured to clamp the rotation shaft (1.1).

As a result of the omega shape of the upper clamp (2.1), the installation of the upper clamp (2.1) on the rotation shaft (1.1) is facilitated, since at the time of installation the operator only has to place the upper clamp (2.1) on an upper face of the rotation shaft (1.1) (the upper face of the rotation shaft (1.1) being understood to mean the face located opposite the ground at the time of installing the present damping system), allowing gravity itself to keep the upper clamp (2.1) clamping the rotation shaft (1.1).

Likewise, the upper clamp (2.1) comprises two pairs of ribs (2.1.1), each pair of ribs (2.1.1) being fixed to one side and to the wing with which said side is fixed, thereby achieving a better distribution of the efforts to which the upper clamp (2.1) is subjected, increasing the service life thereof.

In addition, the upper clamp (2.1) comprises two openings in each wing for the passage of attachment means (for example, screws, rivets, etc.) for fixing both wings to the same lever (2.2).

The rotation shaft (1.1) is thereby compressed by the upper clamp (2.1) and the lever (2.2) when tightening said attachment means, securing the upper support (2) to the rotation shaft (1.1).

Said lever (2.2) has an inverted U-shaped profile, comprising respective openings on its central surface for the passage of attachment means for fixing the lever (2.2) to the wings of the upper clamp (2.1).

It should be noted that, although this preferred example mentions that the lever has an inverted U-shaped profile, it is not ruled out that the lever can have a U-shaped, C-shaped, H-shaped, square-shaped, etc., profile.

In this preferred exemplary embodiment, the lever (2.2) comprises at its end furthest away from the rotation shaft (1.1) a fixing point on each wing of the lever (2.2) for the installation of an upper shaft (2.3), through which the damper (4) is fixed.

The upper shaft (2.3) is thereby supported at both ends, instead of just one, therefore a better distribution of efforts is obtained, thereby increasing the service life of the damping system. More specifically, the damper (4) comprises at one of its ends an upper tie (4.2), for the attachment between the damper (4) and the upper support (2), and at its other end a lower tie (4.3) for the attachment of the damper (4) to the lower support (3).

Said upper tie (4.2) comprises an opening for the passage of the upper shaft (2.3), thereby achieving the transmission of the rotational movement of the rotation shaft (1.1) to the damper (4) in a linear manner and achieving that the damper (4) has an angular movement between the damper (4) and the lever (2.2).

The damper (4) can be a hydraulic cylinder, of the type comprising a rod (4.1) at one end of the damper (4) and where the rod (4.1) extends and contracts in the longitudinal direction of the damper (4).

Figure 5:
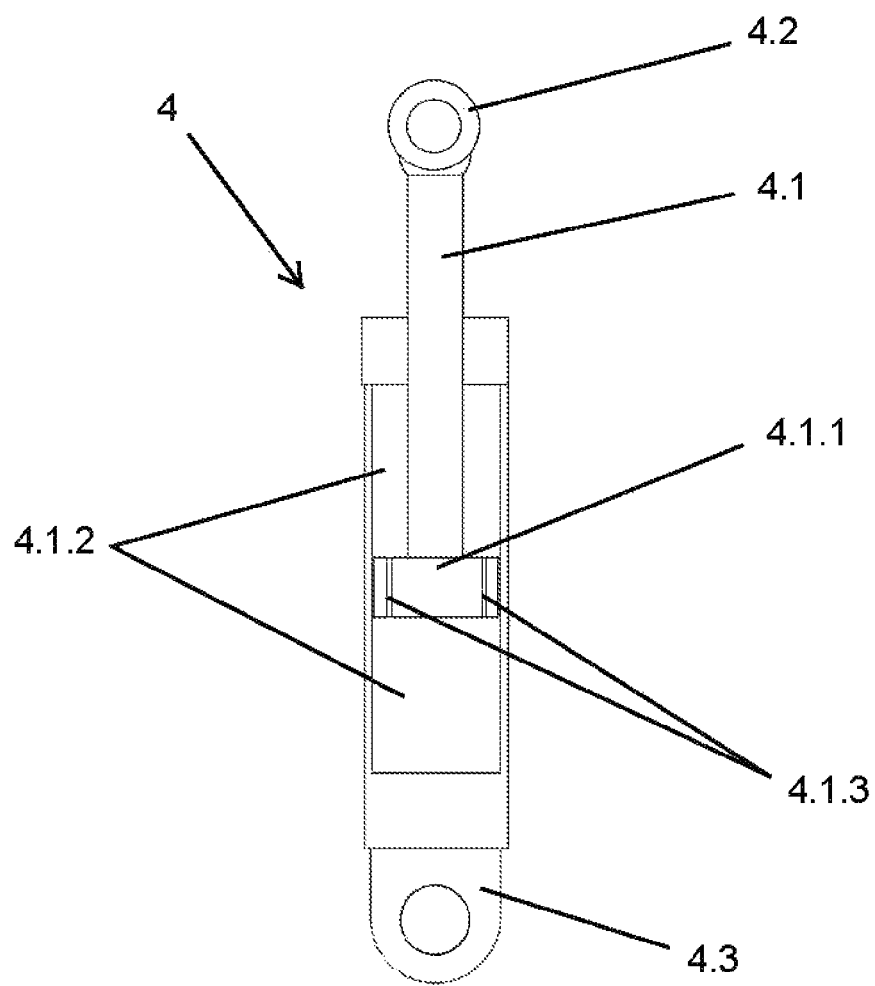
FIG. 5 shows a schematic image of the interior of the damper.

As can be seen in FIG. 5, the rod (4.1) comprises at one of its ends (specifically at the end that is located inside the damper (4)) a piston (4.1.1), which separates two chambers (4.1.2) filled with hydraulic oil, both chambers (4.1.2) communicating with one another by means of holes (4.1.3) present in the piston (4.1.1).

In this way, when the rod (4.1) extends or contracts, it forces the passage of hydraulic fluid between both chambers (4.1.2) through the holes (4.1.3), which only allow a maximum flow of hydraulic fluid.

Therefore, in the event of a sudden rotation of the rotation shaft (1.1), the flow of hydraulic fluid exceeds this maximum flow of hydraulic fluid, blocking the extension or contraction of the rod (4.1), thus damping the rotation of the rotation shaft (1.1).

In this preferred exemplary embodiment, the rod (4.1) comprises at its end opposite the piston (4.1.1) the upper tie (4.2), however, it is not ruled out that instead of this, the rod (4.1) comprises at its end opposite the piston (4.1.1) the lower tie (4.3).

Figure 6:
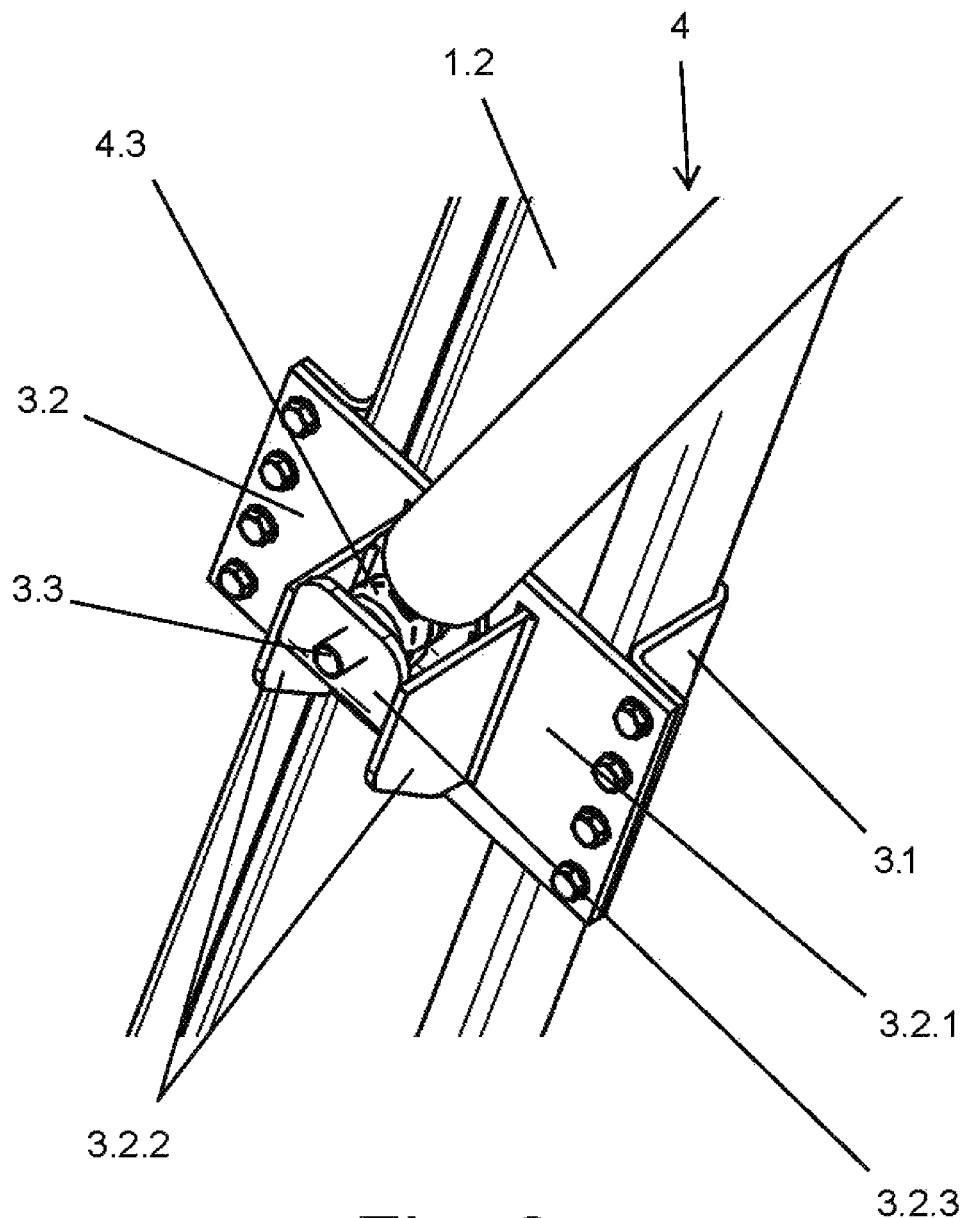
FIG. 6 shows a perspective image of the lower support of FIG. 1.
Figure 7:
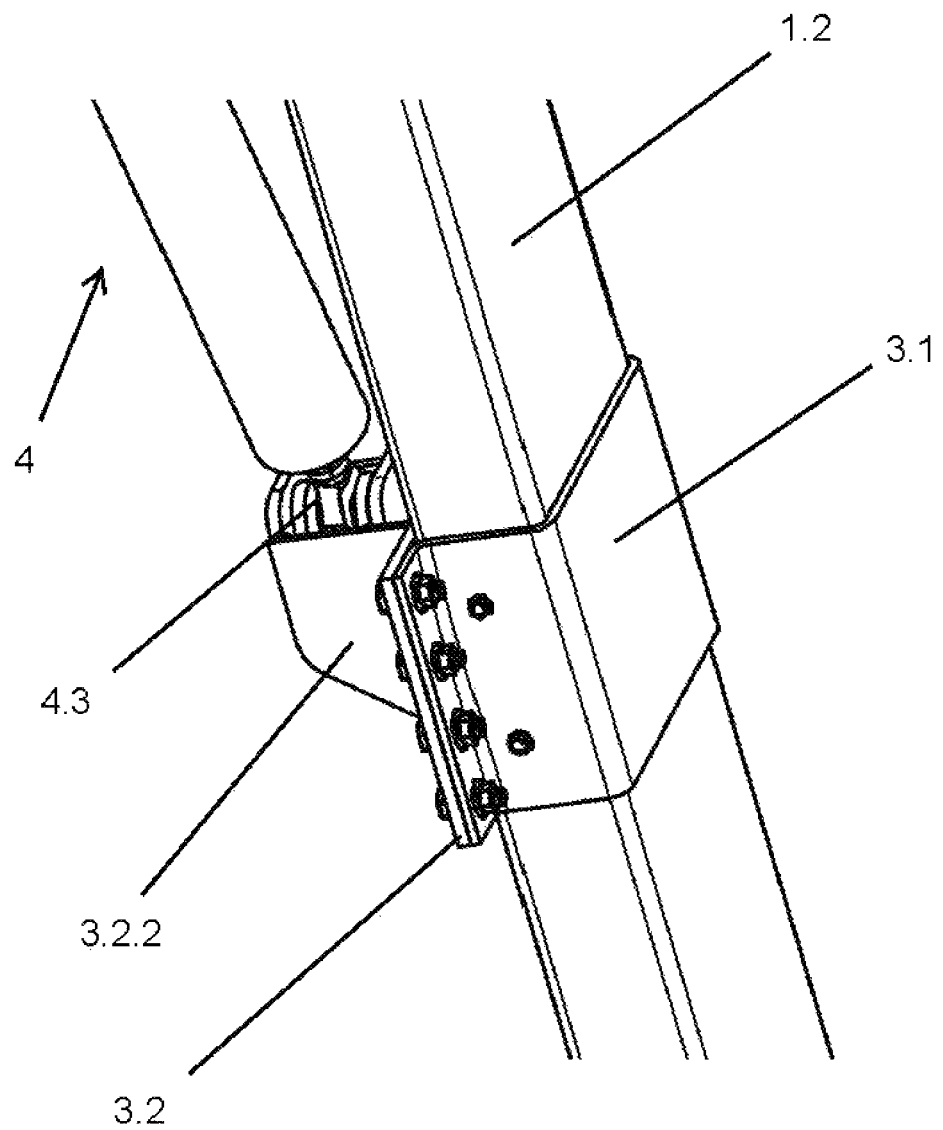
FIG. 7 shows a perspective image of the lower support from a different view than FIG. 6.

As can be seen in FIGS. 6 and 7, the lower support (3) comprises an omega-shaped lower clamp (3.1) configured to clamp the column (1.2) of the solar tracker (1).

Said lower clamp (3.1) comprises at its ends openings for the passage of the attachment means (which can be screws, rivets, etc.) for the fixing thereof with a plate (3.2), although it is not ruled out that the lower clamp (3.1) is fixed to the plate (3.2) by welding.

The column (1.2) is thereby compressed by the lower clamp (3.1) and the plate (3.2) when tightening said attachment means, securing the lower support (3) to the column (1.2).

Figure 8:
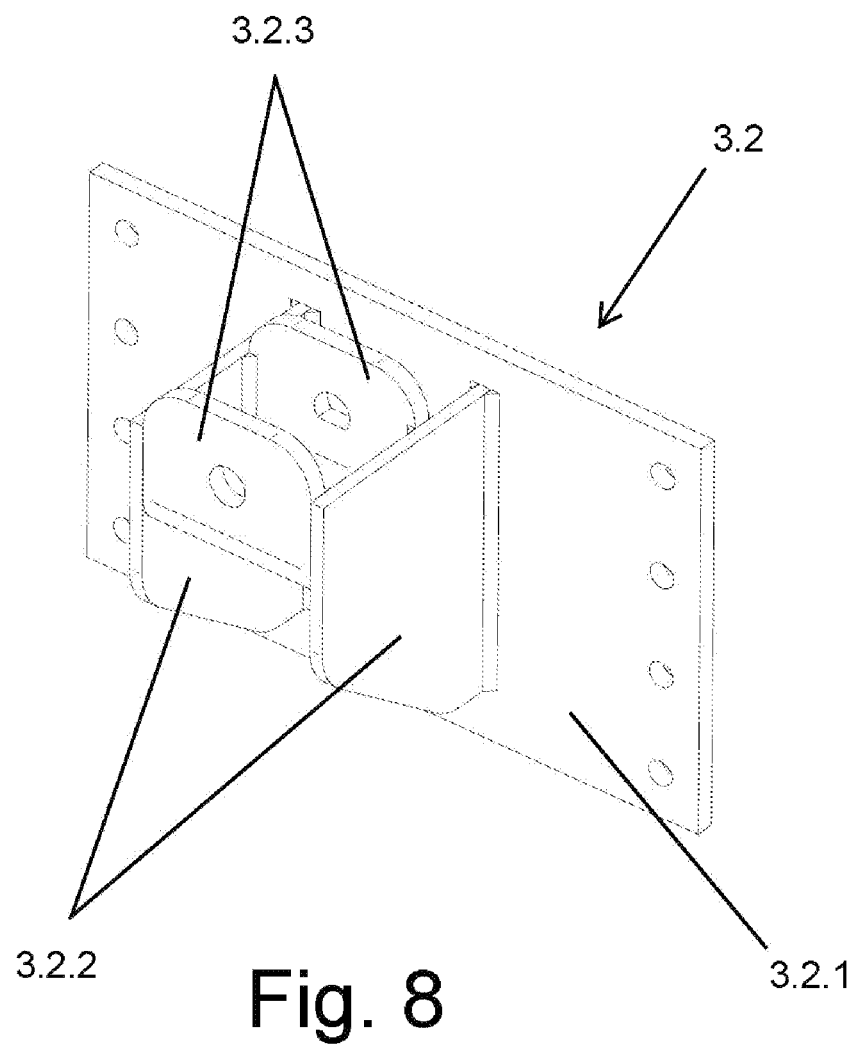
FIG. 8 shows a perspective image of the plate of the lower support of FIG. 6.

As can be inferred from FIG. 8, the plate (3.2) comprises a flat surface (3.2.1) from which there protrude at least two fins (3.2.2) transversally to the flat surface (3.2.1) and in the opposite direction with respect to the column (1.2), both fins (3.2.2) being parallel to one another. A sheet (3.2.3) is fixed between said fins (3.2.2), the sheet (3.2.3) being U-shaped in this preferred exemplary embodiment.

The sheet (3.2.3) comprises at each end an opening for the installation of a lower shaft (3.3), through which the lower tie (4.3) of the damper (4) is fixed.

For this purpose, the lower tie (4.3) comprises an opening for the passage of the lower shaft (3.3), thereby achieving that the damper (4) can have angular movement between the damper (4) and the column (1.2).

With all this, once the rotation shaft (1.1) performs a rotational movement, such movement is transmitted longitudinally to the damper (4), which in the event that the rotational movement is normal, the damper (4) does not prevent said movement, but in the event that said rotational movement is sudden, the damper (4) blocks the rotational movement of the rotation shaft (1.1) of the solar tracker (1).

Figure 9:
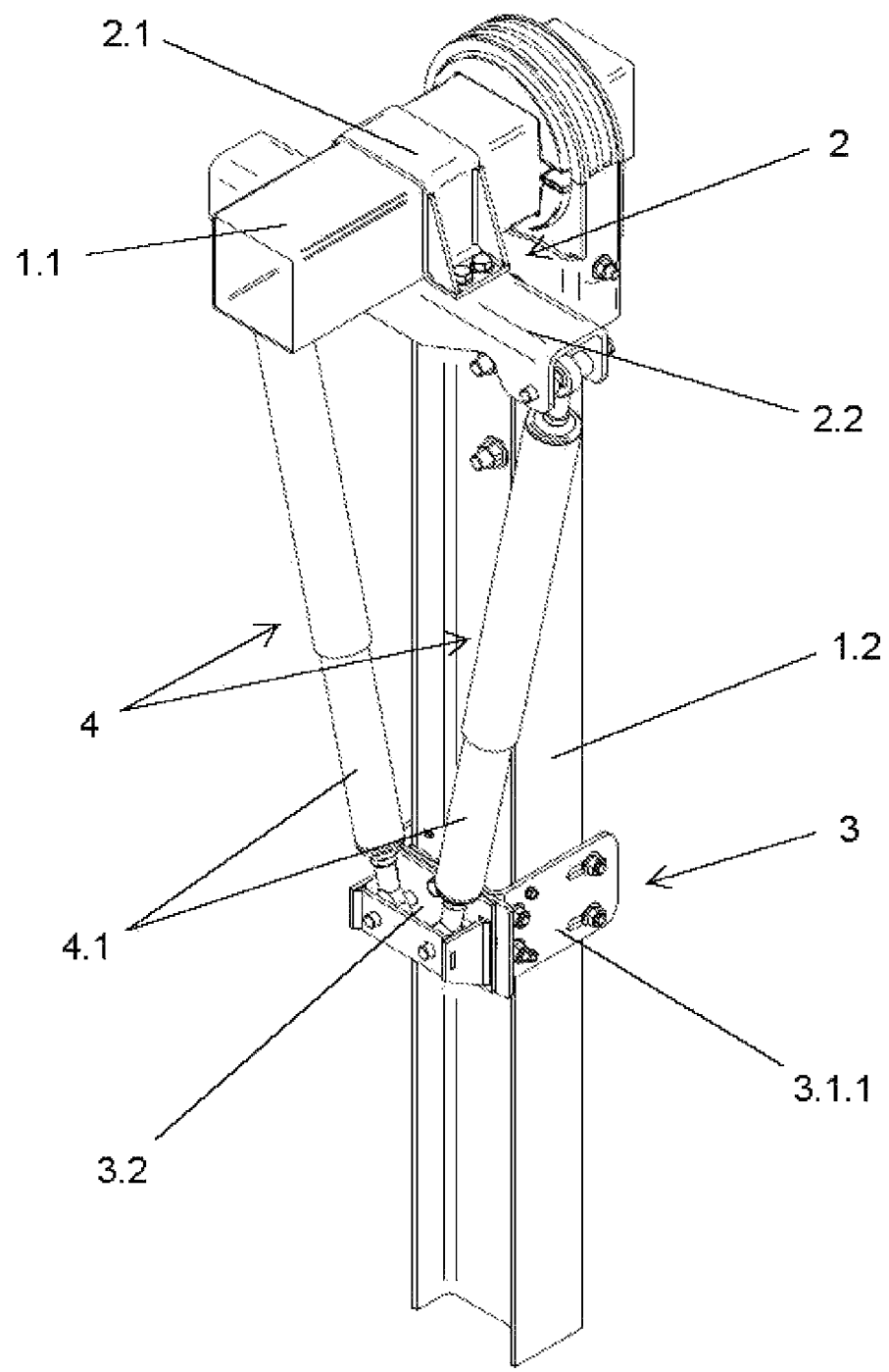
FIG. 9 shows a perspective image of another exemplary embodiment of the damping system of a solar tracker of the present invention.
Figure 10:
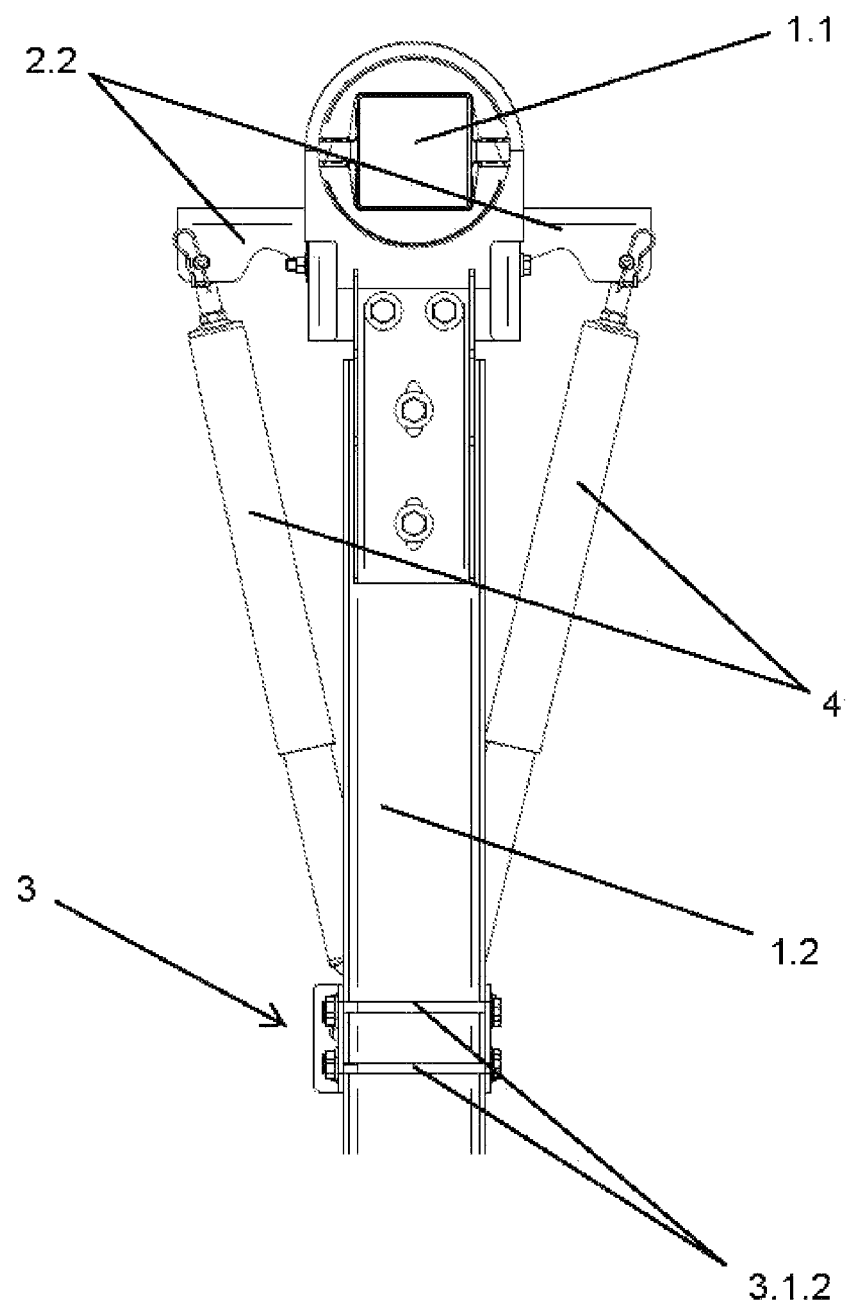
FIG. 10 shows a profile image of the damping system shown in FIG. 9.

FIGS. 9 and 10 show another exemplary embodiment of the present invention, in which the damping system comprises two dampers (4).

Both dampers (4) are attached by their respective upper ties (4.2) to the lever (2.2) of the upper support (2) and by their respective lower ties (4.3) to the plate (3.2) of the lower support (3).

Figure 11:
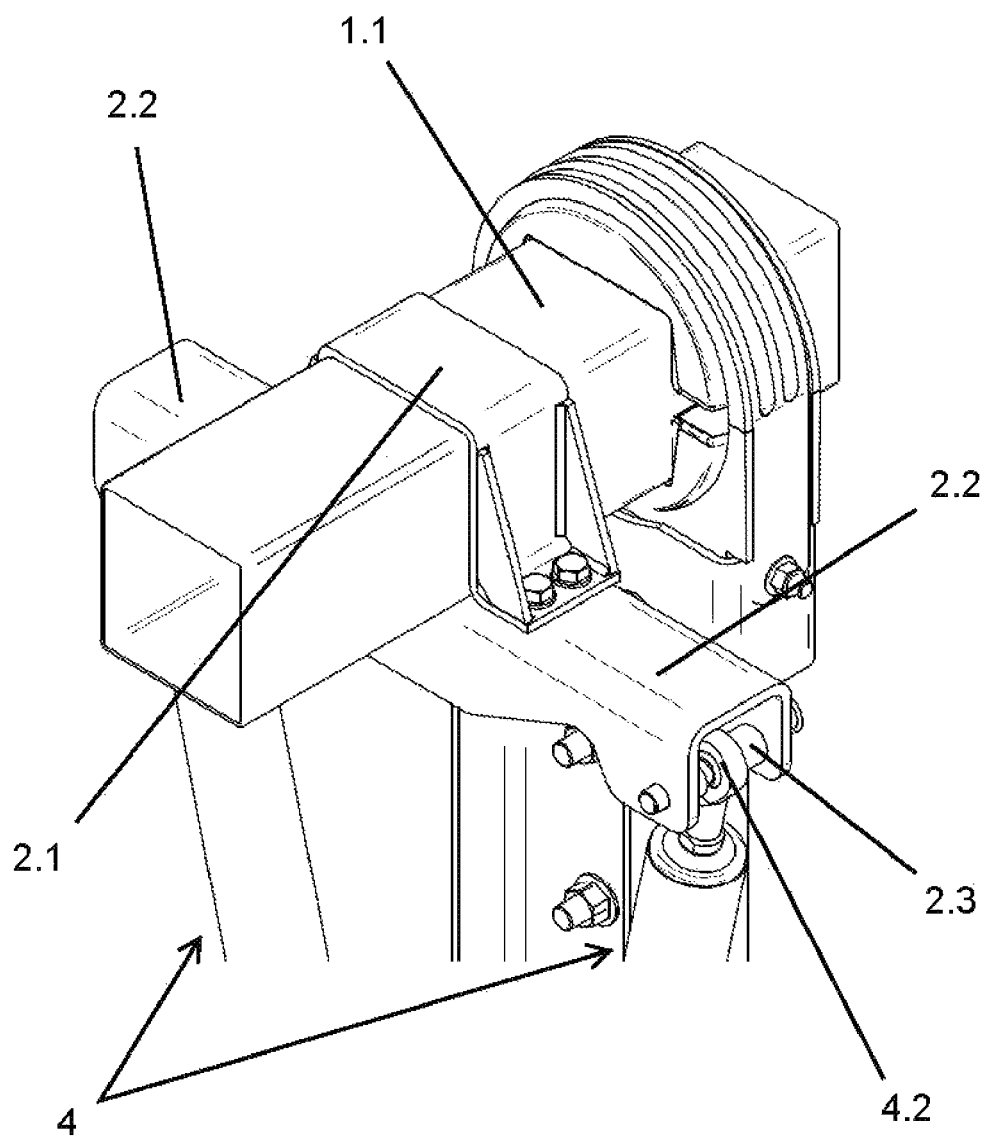
FIG. 11 shows a perspective image of the upper support of FIG. 9.
Figure 12:
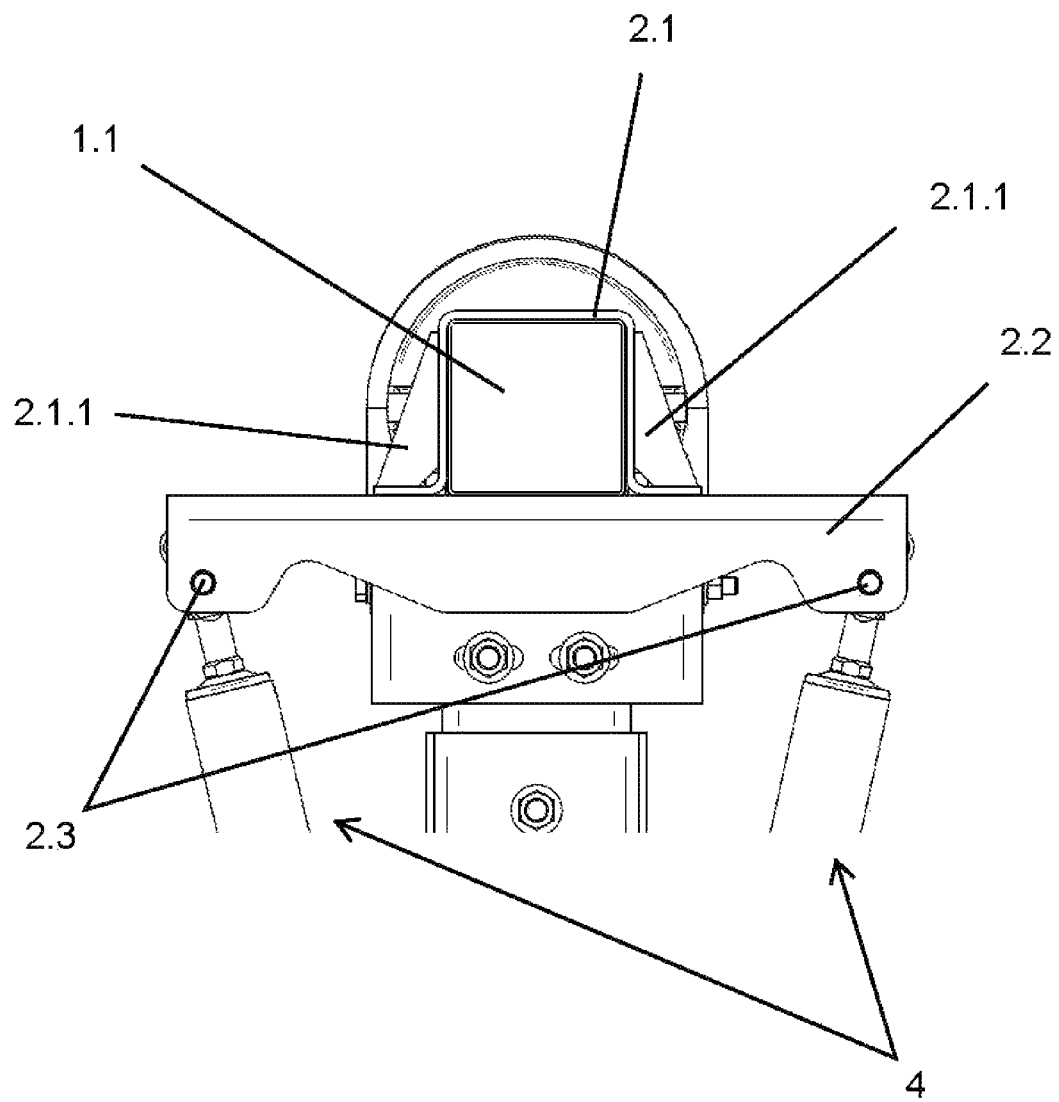
FIG. 12 shows a profile image of the upper support of FIG. 11.

As can be seen in FIGS. 11 and 12, the lever (2.2) of the upper support (2) comprises two ends protruding from the rotation shaft (1.1) and where an upper shaft (2.3) is fixed at each end.

Likewise, it can be seen in said figures that the two ends of the lever (2.2) protrude equidistantly on both sides of the rotation shaft (1.1), although it is not ruled out that said ends protrude non-equidistantly on both sides of the rotation shaft (1.1).

As in the previous exemplary embodiment, each upper shaft (2.3) is fixed at each end to a different wing of the lever (2.2), preventing the upper shaft (2.3) from being supported at only one end, therefore a better distribution of efforts is obtained, thereby increasing the service life of the damping system.

Figure 13A:
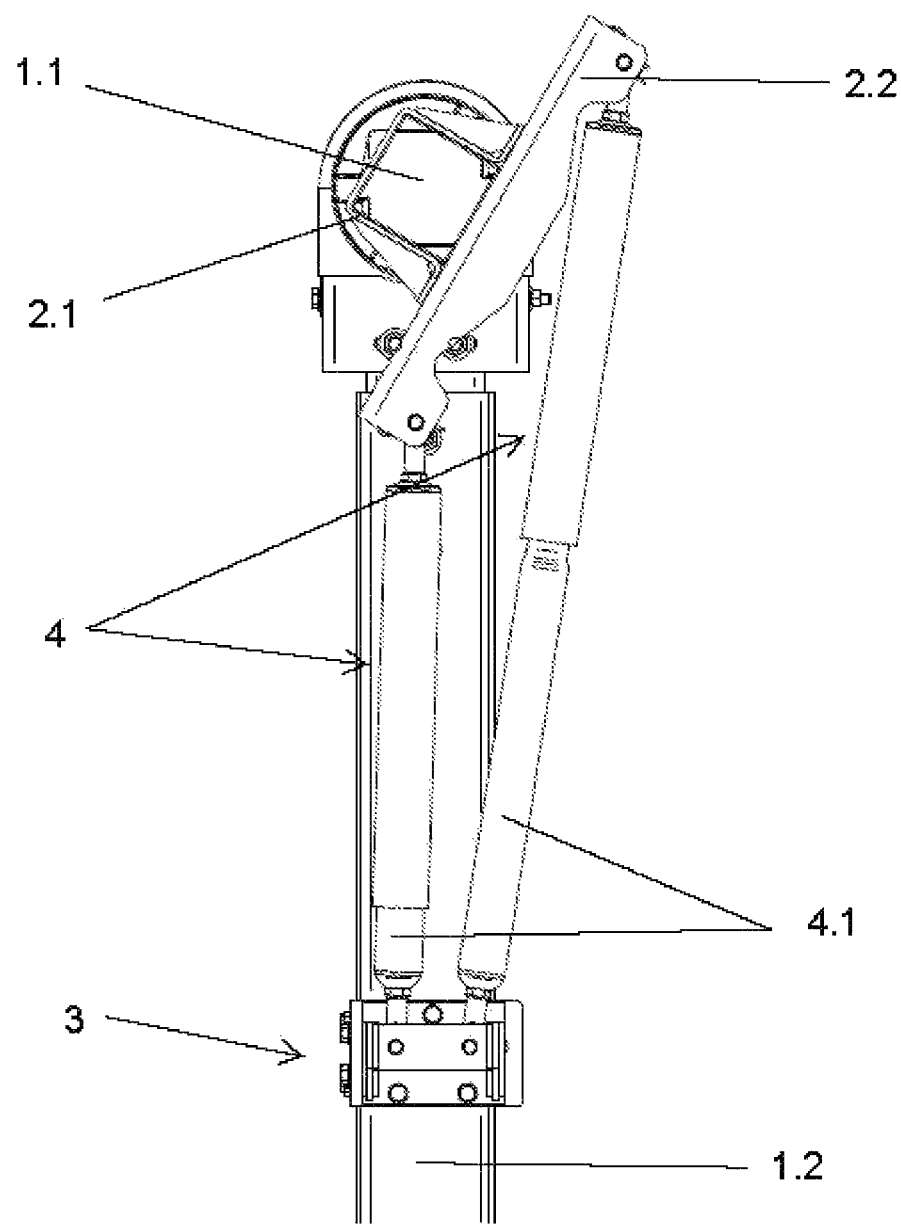
FIGS. 13A and 13B show respective profile images of the damping system shown in FIG. 9 at different moments of the rotational movement of the solar tracker.
Figure 13B:
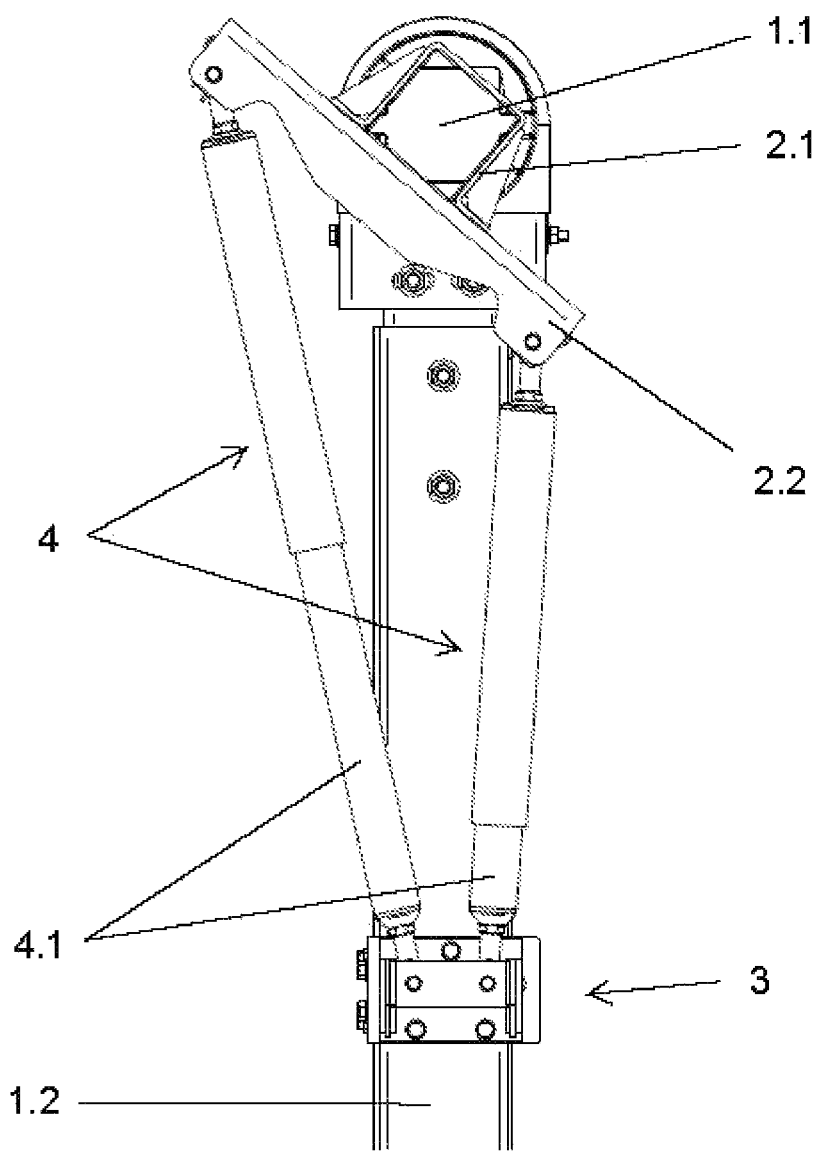

As can be seen in FIGS. 13A and 13B, during the rotation of the rotation shaft (1.1) while the rod (4.1) of one of the dampers (4) extends, the rod (4.1) of the other damper (4) contracts, thereby doubling the ability to block the rotational movement of the rotation shaft (1.1) in the event of a sudden rotation.

Figure 14:
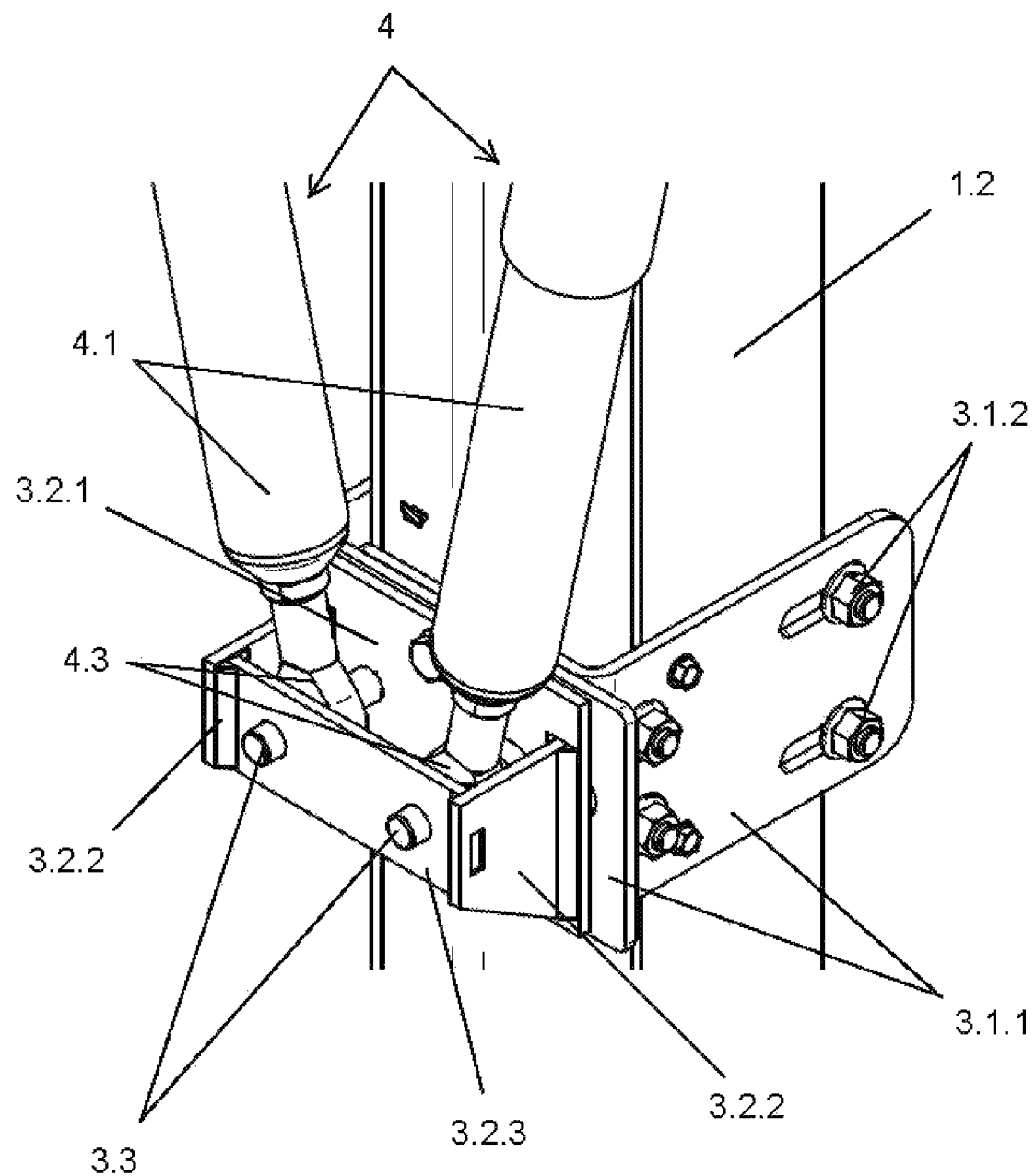
FIG. 14 shows a perspective image of the lower support shown in FIG. 9.
Figure 15:
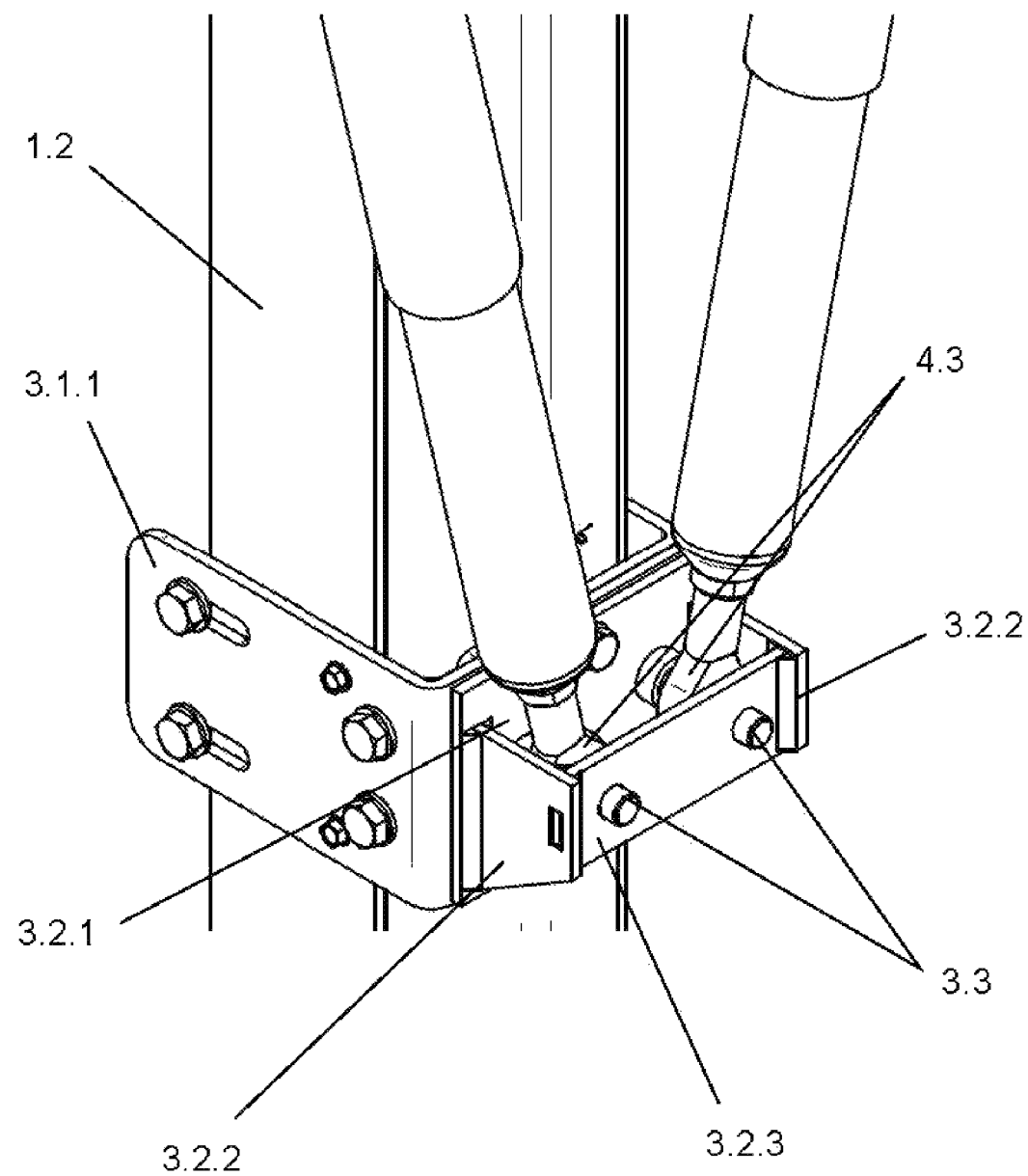
FIG. 15 shows a perspective image of the lower support from a different view than FIG. 14.

In this exemplary embodiment, the lower support (3) comprises a lower clamp (3.1) which in turn comprises two sub-clamps (3.1.1) with an L-shaped profile superimposed on one another, being fixed to the column (1.2) and clamping same by means of tightening means (3.1.2) (for example, bolts), as can be inferred from FIGS. 14 and 15.

The column (1.2) is thereby compressed by the sub-clamps (3.1.1) when tightening said tightening means (3.1.2), without the need for a plate (3.2) to tie the lower support (3) to the column (1.2).

This also allows the lower clamp (3.1) to clamp columns (1.2) of different shapes (for example, H- or U-shaped) or sizes, which in turn increases the flexibility of the installation of the damping system.

Likewise, it is not ruled out that the lower shaft (3.3) is fixed to the superimposed wings of the sub-clamps (3.1.1), the lower tie (4.3) being fixed to the lower shaft (3.3).

Preferably, on the superimposed wings of the sub-clamps (3.1.1) there is fixed a plate (3.2) (for example, by means of screwing, welding, etc.), in which the lower tie (4.3) of the damper (4) is fixed.

As can be inferred from FIGS. 14 and 15, the plate (3.2) comprises a flat surface (3.2.1) from which there protrude at least two fins (3.2.2) transversely to the flat surface (3.2.1) and in the opposite direction with respect to the column (1.2), both fins (3.2.2) being parallel to one another.

A sheet (3.2.3) is fixed between said fins (3.2.2), the sheet (3.2.3) having a flat surface in this preferred exemplary embodiment.

The sheet (3.2.3) comprises two openings for the installation of respective lower shafts (3.3), where the lower shafts (3.3) are fixed at one end to the sheet (3.2.3) and at the other end to the plate (3.2), each lower tie (4.3) of both dampers (4) being fixed to the respective lower shafts (3.3).

Both lower shafts (3.3) are thereby prevented from being supported at only one end, therefore a better distribution of efforts is obtained, thereby increasing the service life of the damping system.

The invention claimed is:

1. A damping system of a solar tracker (1) comprising at least one damper (4) comprising a rod (4.1), an upper tie (4.2) and a lower tie (4.3) located at an end of the at least one damper (4) opposite the upper tie (4.2); wherein the upper tie (4.2) is fixed by means of an upper support (2) to a rotation shaft (1.1) of the solar tracker (1), and wherein the lower tie (4.3) is fixed by means of a lower support (3) to a column (1.2) of the solar tracker (1), so that with the rotation of the rotation shaft (1.1), the rod (4.1) of the at least one damper (4) is caused to retract or extend, wherein the upper support (2) comprises a lever (2.2) comprising at least one end protruding from the rotation shaft (1.1) with at least two securing points at which the upper tie (4.2) of the damper (4) is fixed by means of an upper shaft (2.3) of the upper tie (4.2) which is fixed at the at least two securing points of the lever (2.2) wherein the lower support (3) comprises a lower clamp (3.1) comprising two sub-clamps (3.1.1) with an L-shaped profile superimposed on one another, being fixed to the column (1.2) and clamping same by means of bolts and
wherein a plate (3.2) is fixed on the superimposed wings of the sub-clamps (3.1.1) in which the lower tie (4.3) of the damper (4) is fixed.

2. The damping system according to claim 1, wherein the lever (2.2) has an inverted U-shaped profile comprising at least one securing point on each wing of the lever (2.2).

3. The damping system according to claim 1, wherein the upper support (2) comprises an upper clamp (2.1) surrounding the rotation shaft (1.1) and the lever (2.2) is fixed to the upper clamp (2.1).

4. The damping system according to claim 3, wherein the upper clamp (2.1) has an inverted U-shaped profile having wings extending on each side where the lever (2.2) is fixed.

5. The damping system according to claim 1, further comprising two dampers (4) and the lever (2.2) comprises two ends protruding from the rotation shaft (1.1), in which the upper fastening (4.2) of the respective damper (4) is fixed at each end.

6. The damping system according to claim 1, wherein the lower support (3) comprises a lower clamp (3.1) with an inverted U-shaped profile having wings extending on each side, surrounding the column (1.2) where a plate (3.2) is fixed and wherein the lower tie (4.3) of the damper (4) is fixed.

7. The damping system according to claim 6, wherein the plate (3.2) comprises two fins (3.2.2) projecting outwards, between which there is arranged a sheet (3.2.3) to which at least one end of a lower shaft (3.3) is fixed, the other end of the lower shaft (3.3) being fixed to the plate (3.2) or to the sheet (3.2.3) and where the lower tie (4.3) is fixed to the lower shaft (3.3).

8. A damping system of a solar tracker (1) comprising at least one damper (4) comprising a rod (4.1), an upper tie (4.2) and a lower tie (4.3) located at an end of the at least one damper (4) opposite the upper tie (4.2); wherein the upper tie (4.2) is fixed by means of an upper support (2) to a rotation shaft (1.1) of the solar tracker (1), and wherein the lower tie (4.3) is fixed by means of a lower support (3) to a column (1.2) of the solar tracker (1), so that with the rotation of the rotation shaft (1.1), the rod (4.1) of the at least one damper (4) is caused to retract or extend, wherein the upper support (2) comprises a lever (2.2) comprising at least one end protruding from the rotation shaft (1.1) with at least two securing points at which the upper tie (4.2) of the damper (4) is fixed by means of an upper shaft (2.3) of the upper tie (4.2) which is fixed at the at least two securing points of the lever (2.2),
wherein the lower support (3) comprises a lower clamp (3.1) with an inverted U-shaped profile having wings extending on each side surrounding the column (1.2), wherein a plate (3.2) is fixed and wherein the lower tie (4.3) of the damper (4) is fixed; and
wherein the plate (3.2) comprises two fins (3.2.2) projecting outwards, between which there is arranged a sheet (3.2.3) to which at least one end of a lower shaft (3.3) is fixed, the other end of the lower shaft (3.3) being fixed to the plate (3.2) or to the sheet (3.2.3) and where the lower tie (4.3) is fixed to the lower shaft (3.3).

9. The damping system according to claim 8, wherein the lever (2.2) has an inverted U-shaped profile comprising at least one securing point on each wing of the lever (2.2).

10. The damping system according to claim 8, wherein the upper support (2) comprises an upper clamp (2.1) surrounding the rotation shaft (1.1) and the lever (2.2) is fixed to the upper clamp (2.1).

11. The damping system according to claim 10, wherein the upper clamp (2.1) has an inverted U-shaped profile having wings extending on each side, wherein the lever (2.2) is fixed.

12. The damping system according to claim 8, further comprising two dampers (4) and the lever (2.2) comprises two ends protruding from the rotation shaft (1.1), in which the upper fastening (4.2) of the respective damper (4) is fixed at each end.

13. The damping system according to claim 8, wherein the lower clamp (3.1) comprises two sub-clamps (3.1.1) with an L-shaped profile superimposed on one another, fixed to the column (1.2) and clamped by means of bolts.

14. The damping system according to claim 13, wherein a plate (3.2) is fixed on the L-shaped profile of the sub-clamps (3.1.1) wherein the lower tie (4.3) of the damper (4) is fixed.

* * * * *